(12) United States Patent
Luke et al.

(10) Patent No.: US 6,233,640 B1
(45) Date of Patent: May 15, 2001

(54) UNIVERSAL SERIAL BUS PERIPHERAL BRIDGE WITH SEQUENCER

(75) Inventors: David D. Luke; David C. Gilbert, both of Boise, ID (US)

(73) Assignee: In-System Design, Inc., Boise, ID (US)

( * ) Notice: Subject to any disclaimer, the term of this patent is extended or adjusted under 35 U.S.C. 154(b) by 0 days.

(21) Appl. No.: 09/273,310

(22) Filed: Mar. 19, 1999

(51) Int. Cl.[7] ................................................. G06F 13/00
(52) U.S. Cl. ............................ 710/129; 710/53; 710/52; 710/5; 710/62; 710/71; 710/105
(58) Field of Search .................................. 710/5, 52, 53, 710/62, 71, 105, 129

(56) References Cited

U.S. PATENT DOCUMENTS 5,974,486 * 10/1999 Siddappa ................................. 710/53
6,067,628 * 5/2000 Krithivas et al. ....................... 710/63

* cited by examiner

Primary Examiner—Xuan M. Thai
(74) Attorney, Agent, or Firm—Marger Johnson & McCollom, PC

(57) ABSTRACT

A Universal Serial Bus to parallel bus bridge includes a Universal Serial Bus port that receives a serial bit stream of data and commands in a Universal Serial Bus protocol from a USB host computer. A parallel bus port on the bridge includes parallel port registers and state machines coupled to a peripheral device. A USB controller core is coupled between the Universal Serial Bus port and the parallel bus port and converts data and commands between the Universal Serial Bus protocol and the parallel bus protocol. A sequencer is coupled between the USB controller core and the parallel bus port. A sequence of sequencer commands is loaded into memory in the USB bridge and used by the sequencer to perform a sequence of parallel port operations. The sequencer performs the commands autonomously without intervention from the USB host computer. Because the host computer does not have to initiate a USB transaction for each individual parallel port operation, the sequence of operations is completed in a shorter amount of time.

21 Claims, 9 Drawing Sheets

Sequencer Instructions

R: Register Address  L: Loop Count
D: Data  M: Data Mask
U: Upper/Lower nibble selection  A: External memory device address
X: Reserved (set to zero)

| RWRI | 1010 |
|---|---|

| 1010RRRR | DDDDDDDD | | |
|---|---|---|---|
| Register Write  The Data byte will be written to the specified register. ||||

Table 1-Register Write

| RRMW | 0001 |
|---|---|

| 0001RRRR | DDDDDDDD | MMMMMMMM | |
|---|---|---|---|
| Register Read-Modify-Write  The addressed register will be read and the returned data will be modified with the Data and Mask fields and written back. All bits in the original register data for which the corresponding bit Mask byte is set to '1' will be replaced with the corresponding bits from the Data byte. Bits in the original register data for which the corresponding Mask byte is '0' will be unchanged after the RRMW instructions. ||||

Register Read-Modify-Write

| RRCM | 0010 |
|---|---|

| 0010RRRR | LLLLLLLL LLLLLLLL | DDDDDDDD | MMMMMMMM |
|---|---|---|---|
| Register Read Compare Until Match  The addressed register will be read and data bits for which the corresponding Mask bit is '1' will be compared with the corresponding bits in the data byte. Data bits for which the Mask bit is '0' will not be compared. If the bits selected by the Mask byte match, execution will pass to the next instruction. If the selected bits don't match, the loop count will be decremented and the instruction will execute again after a delay controlled by the Slow RRCM and NOOP bits in a USB bridge Control register. The read/mask/compare process will continue until a match is made or the loop count expires, whichever comes first. If the loop count expires, the sequence will be aborted. ||||

Register Read Compare Until Match

FIG.7A

| RREN | 0011 | | | |
|---|---|---|---|---|
| 0011XXXU | | | | |
| Register Read Extract Nibble<br>The Status register will be read and the bits corresponding to the lines used in IEEE 1284 Nibble Mode will be extracted and packed into the designated nibble (U='1' for the upper nibble) in the data stream. If U is set to '1', the current nibble and a previously-latched nibble will be concatenated and loaded into the Bulk In buffer. | | | | |

Register Read Extract Nibble

| WBIB | 0100 | | |
|---|---|---|---|
| 0000LLLL | LLLLLLLL | LLLLLLLL | |
| Wait for Bulk In Byte<br>The sequencer will enable the data path and wait until the designated number of bytes has been placed into the Bulk In buffer before continuing. Execution will resume when the designated number of bytes has been made available to the USB host. This dose not indicate that the host has actually read the data.<br><br>This command is useful for tranferring data using the hardware assisted input modes provided by the ECP 60 and ATA 65 parallel port 44. | | | |

Wait for Bulk In Byte

| WBOB | 0101 | | |
|---|---|---|---|
| 0101LLLL | LLLLLLLL | LLLLLLLL | |
| Wait for Bulk Out Byte<br>The sequencer will enable the data path and wait until the designated number of bytes has been read from the Bulk Out buffer before continuing.<br><br>This command is useful for transferring data using the hardware assisted output modes provided by the Compatibility 56, ECP 60, EEP 62, and ATA 65. | | | |

Wait for Bulk Out Byte

| DATI | 0110 | | | |
|---|---|---|---|---|
| 0110RRRR | | | | |
| Read Register Into Pipe<br>The specified register will be read and the data pushed into the Bulk In buffer. | | | | |

Read Register Into Pipe

FIG.7B

| DATO | 0111 | | | |
|---|---|---|---|---|
| 0111RRRR | | | | |
| Write Register From Pipe<br>A byte will be removed from the Bulk Out buffer and written into the specified register. | | | | |

Write Register From Pipe

| EPPI | 1001 | | | |
|---|---|---|---|---|
| 1001LLLL | LLLLLLLL | LLLLLLLL | | |
| EPP Data Read<br>The EPP Data register will be read the specified number of times, and the data returned will be pushed into the Bulk In buffer. | | | | |

EPP Data Read

| NOOP | 1000 | | | |
|---|---|---|---|---|
| 1000LLLL | LLLLLLLL | | | |
| No Operation<br>The sequencer will wait for the designated number of time periods as selected by the slow RRCM and NOOP bit in the USB bridge Control register before execution passes to the next instruction. | | | | |

No Operation

| SUBR | 1011 | | | |
|---|---|---|---|---|
| 0000XAAA | AAAAAAAA | | | |
| Execute Subroutine<br>Transfers control to a sequence stored in the external memory device (e.g.EEPROM), beginning at the specified physical address. Sequences in the external memory device may be as long as desired, as long as they do not cross page boundaries, which gives a maximum length o 256 bytes when using a single EEPROM. | | | | |

Execute Subroutine

| RETN | 1011 | | | |
|---|---|---|---|---|
| 1011XXXX | | | | |
| Return from Subroutine<br>Returns control back to the main sequence. Execution is transferred to the instruction following the USBR instruction in the main sequence. | | | | |

Return from Subroutine

FIG.7C

UNIVERSAL SERIAL BUS PERIPHERAL BRIDGE WITH SEQUENCER

FIELD OF THE INVENTION

This invention pertains generally to parallel/serial bus bridges, and more particularly to a sequencer used in a Universal Serial Bus to parallel port bridge.

BACKGROUND OF THE INVENTION

The Universal Serial Bus (USB) is described in its current release in the Universal Serial Bus Specification Revision 1.1 and is envisioned as an industry standard for the connection of all peripherals to a personal computer or workstation. USB seeks to replace the various specialized connectors and communication formats utilized with keyboards, mice, joysticks, multimedia inputs and outputs, printers, external disk drives, external CD-ROM drives, modems, parallel ports, serial ports, network connections, and virtually any other type of peripheral, with a single universal cable and connector type and a common communication format. Some of the other features of USB are: a true plug-and-play architecture requiring no user configuration, flexibility, and low cost.

USB is a complete break from the past—it provides no backward compatibility with previous communication interfaces. But many new users of USB-equipped computers have significant investments in non-USB peripherals such as parallel cable-interfaced printers. Rather than junking these legacy peripherals, many users would prefer to somehow utilize non-USB peripherals with USB-equipped computers. Several vendors have addressed this need by offering USB bridges, which convert USB signals to a legacy format and vice-versa.

The problem with using a USB bridge is that a substantial latency penalty is imposed by the USB hardware and software each time an instruction or data is transferred across the bridge between the USB bus and the peripheral. When a sequence of commands is conducted over the USB bus, the delay accumulates as each individual command is sent separately via a USB transaction over the Universal Serial Bus. As a result, long sequences of operations sent to the USB bridge create latency problems.

SUMMARY OF THE INVENTION

The present invention solves the latency problem by incorporating a sequencer into the USB bridge. The sequencer transfers a portion of the controlling intelligence to the parallel port side of a USB connection. This allows any latency penalty imposed by the USB hardware and software to be paid only once for any large set of instructions transferred across the USB bus, instead of once for each individual instruction transferred across the USB bus.

A Universal Serial Bus to parallel bus bridge according to the invention includes a Universal Serial Bus port that receives a serial bit stream of data and commands in a Universal Serial Bus protocol from a host computer. A parallel bus port on the bridge includes parallel port registers used to control access to a peripheral device. A USB core is coupled between the Universal Serial Bus port and the parallel bus port and converts data and commands between the Universal Serial Bus protocol and the parallel bus protocol.

The sequencer is coupled between the USB core and the parallel bus port. A sequence of sequencer commands is loaded into memory in the USB bridge and used by the sequencer to perform a sequence of parallel port operations. The sequencer performs the commands autonomously without intervention from the USB host computer. Because the host computer does not have to initiate a USB transaction for each individual parallel port operation, the sequence of operations is completed in a shorter amount of time.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

The invention may be best understood by reading the disclosure with reference to the drawing, wherein:

FIGS. 7A–7C list commands performed by the sequencer shown in FIG. 6.

DETAILED DESCRIPTION OF THE PREFERRED EMBODIMENTS

The present invention generally applies to bridges that operate between an upstream USB and a downstream bus of a different type. The specific embodiments described below exemplify the downstream bus with a bus commonly used in printers and the like—a parallel-port IEEE 1284 compatible bus, or a bus commonly used in disk drives, like ATA. An IEEE 1284 compatible bus allows communication between a host and a peripheral using at least one data transfer mode as described in IEEE Std. 1284-1994 Standard Signaling Method for a Bi-directional Parallel Peripheral Interface for Personal Computers. Given the concepts supplied below, one of ordinary skill can readily adapt the embodiments of the invention to bridges between a USB and other parallel and serial bus types.

Figure 1:
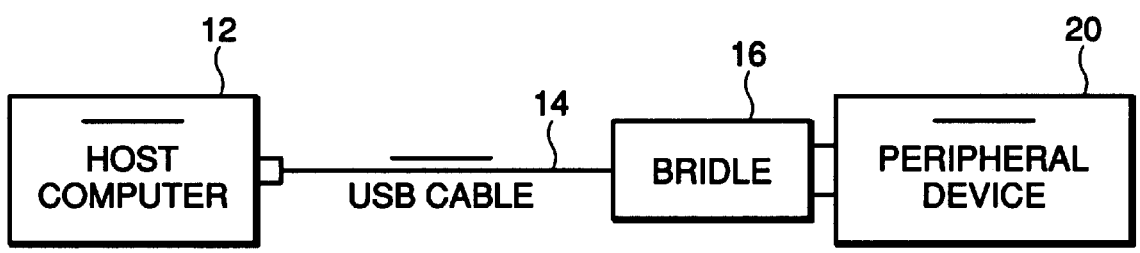
FIG. 1 shows a USB bridge according to the invention connected between a peripheral device and a host computer.

Referring to FIG. 1, a USB bridge 16 is used to connect a non-USB peripheral device 20 to a USB host computer 12. Generally, this requires the bridge 16 to look like a function of that peripheral type (e.g., a printer) to the USB host 12. At the same time, the bridge 16 must look like a host computer parallel port to the peripheral device 20.

In one embodiment of the invention, the USB bridge 16 is a stand alone device connected between the host computer 12 and an IEEE 1284 peripheral device 20. A USB cable 14 connects the host computer 12 to a USB port on USB bridge 16. Alternatively, an IEEE 1284 parallel cable (not shown) can be used to connect the peripheral device 20 to an IEEE 1284 parallel port on bridge 16. In other embodiments, the bridge circuitry 16 is not stand-alone, but located either in the host computer 12 or in the peripheral device 20.

Figure 2:
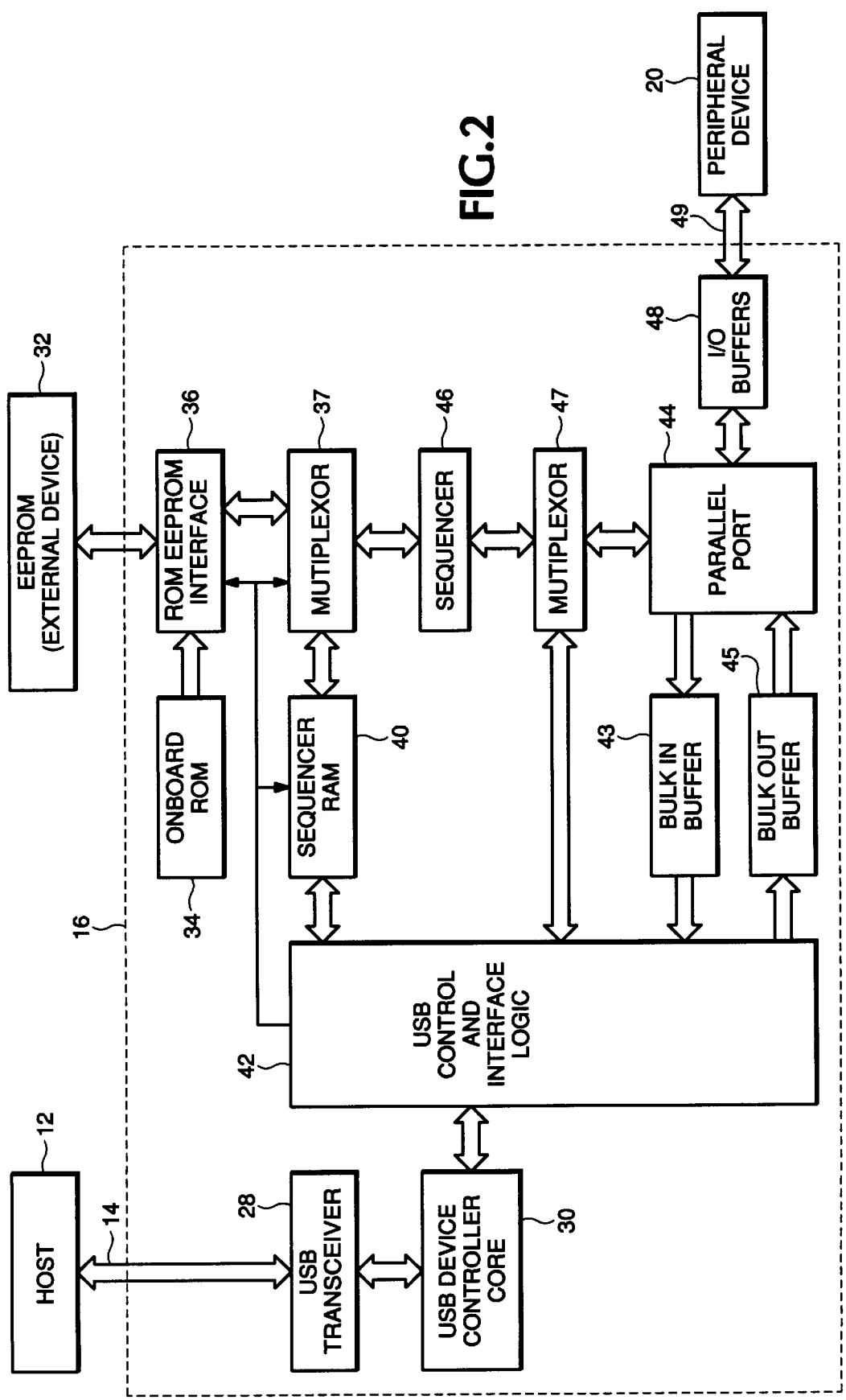
FIG. 2 shows a functional block diagram of the USB bridge shown in FIG. 1.

Referring to FIG. 2, the USB bridge 16 includes USB transceivers 28 that receive and transmit a USB serial bit stream to and from the host computer 12. A USB device controller core (USB core) 30 is connected to the transceivers 28 and translates between the USB serial bit stream protocol and another protocol. USB control and interface logic (USB interface) 42 interfaces the USB core 30 to a sequencer Random Access Memory (RAM) 40, bulk_in buffer 43, bulk_out buffer 45 and through a multiplexer (MUX) 47 to a sequencer 46 and a parallel port 44. The parallel port 44 is coupled through the MUX 47 to the sequencer 46 and is also coupled to the bulk_in buffer 43 and bulk_out buffer 45. The peripheral device 20 is coupled to the parallel port 44 through Input/Output (I/O) buffers 48.

A MUX 37 couples the sequencer 46 to the sequencer RAM 40 and to a ROM/EEPROM interface 36. The ROM/EEPROM interface 36 is coupled to both an onboard Read Only Memory (ROM) 34 and to an external memory device 32. In the embodiment shown in FIG. 2, the external memory device 32 is an Electrically Erasable Programmable Read Only Memory (EEPROM) but could be any type of memory device.

The USB core 30 is an application specific standard product developed by Sand Microelectronics, Inc., and available from Lucent Technologies®. The USB core 30, USB interface 42, bulk_in buffer 43, bulk_out buffer 45 and parallel port 44 are explained in detail in co-pending application Ser. No. 08/974,736 filed Nov. 19, 1997 and entitled: Universal Serial Bus to Parallel Bus Signal Converter and Method of Conversion which is incorporated herein by reference.

Figure 3:
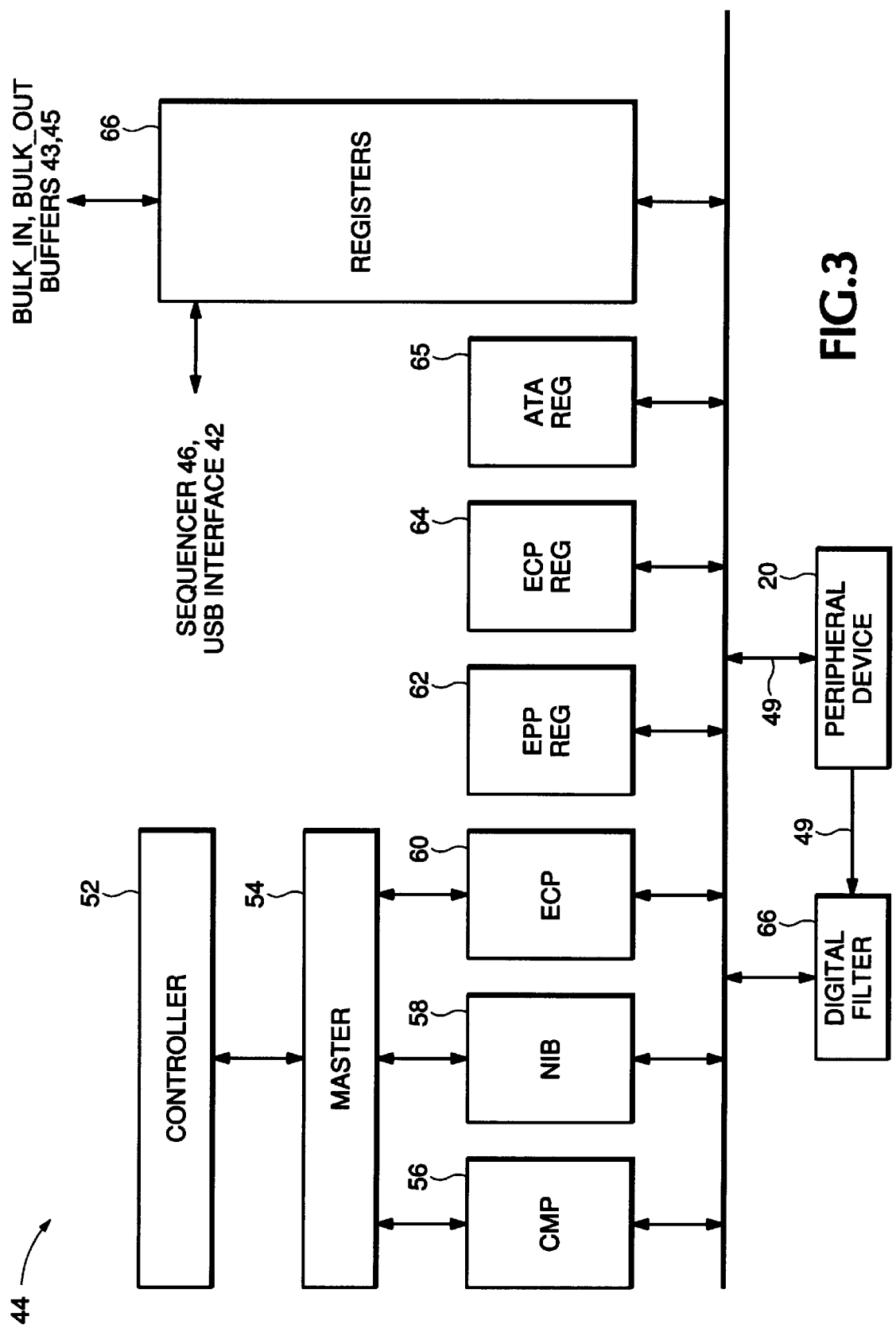
FIG. 3 is a functional block diagram of a parallel port in the USB bridge shown in FIG. 2.

FIG. 3 shows one embodiment of the parallel port 44 which includes a state machine and registers for interfacing with an IEEE 1284 or an ATA peripheral device 20. A controller 52 controls through a master state machine 54, a Compatibility mode protocol host 56, Nibble protocol host 58 and an Extended Capabilities Port (ECP) host 60. A digital filter block 66 is provided for incoming signals from the peripheral device 20. An Extended Parallel Port (EPP) register mode host 62 and an Extended Capabilities Port (ECP) register mode host 64 are also provided. Parallel port registers 66 couple the peripheral device 20 to the bulk_in buffer 43, bulk_out buffer 45, the USB interface 42 and sequencer 46. All data transferred between the USB host 12 and the peripheral device 20 passes through the registers 66.

Of particular interest is the ATA register mode state machine 65. The ATA register mode state machine 65 is used by the host 12 to communicate with ATA peripherals such as disk drives. This state machine provides support for the low-level ATA physical protocol, as described in the ANSI Information Technology—AT Attachment with Packet Interface Extension (ATA/ATAPI-4) draft specification.

The state machine 65 performs PIO data and register transfers to and from an attached ATA or ATAPI device. This state machine provides only the lowest level of ATA support. Higher levels of the ATA and/or ATAPI protocol are provided via the sequencer 46. This provides a great deal of flexibility in interfacing with devices which communicate using the ATA protocol and related or derivative protocols.

Working in conjunction with the ATA register mode state machine 64 is a modification to the parallel port registers 66 which couples the 16-bit ATA bus to the internal 8-bit data path, thus providing translation between the double-byte oriented ATA protocol and the byte-oriented USB protocol. Other bits within the parallel port registers 66 supply the addressing signals required for the ATA protocol.

Referring back to FIG. 2, the USB interface 42 interprets the signals from the USB core 30 and directs the commands to the appropriate circuitry within the USB bridge 16. The USB interface 42 directs forward channel data from the USB core 30 to the bulk_out buffer 45 and returns reverse channel data from the bulk_in buffer 43. The bulk_out buffer 45 accepts or rejects packets of data from the USB interface 42 and passes the accepted data to the parallel port 44. The bulk_in buffer 43 receives data from the parallel port 44 and passes the data to the USB interface 42.

The connection between the USB interface 42 and the MUX 47 is used to access the registers 66 (FIG. 3) contained within the parallel port 44 as well as to access status flags in the sequencer 46. A get_registers command will return the value of all of the parallel port registers 66 (FIG. 3). A set_register command is used to modify values in the parallel port registers.

The USB interface 42 also controls the transfer of data through the sequencer RAM 40, such as descriptor and device identification data from the parallel port 44. Data sent to the external device 32 is loaded into the sequencer RAM 40 and then the ROM interface 36 is signaled to transfer the data to the external device 32.

Access to the sequencer ram 40 is dependent on the activity of the sequencer 46. If the sequencer 46 is active, access to the sequencer ram 40 is locked out to other circuitry in the USB bridge 16. In the case of descriptor data, the USB interface 42 clears the sequencer ram 40 and signals the ROM/EEPROM interface 36 to retrieve data starting at a specified address. The USB interface 42 then begins passing data back to the USB core 30 when the sequencer ram 40 has data available. Device ID data for peripheral device 20 is retrieved in much the same manner as descriptor data, except that the parallel port 44 is directed to retrieve the data rather than the ROM interface 36.

In one particular configuration of the USB bridge 16, the ROM interface 36 at power-up checks whether an external device 32 exists by trying to read from the external device 32. The results of a successful read are used to configure digital filters and 1284 buffer drive characteristics. Other functions can also be performed by the ROM interface 36. If an external device 32 is not detected, a default configuration is used and data that is returned in response to a get_descriptor (device, configuration, or string) command from the USB host 12 is data read from the internal ROM 34.

Sequencer

Of particular interest in the USB bridge 16 is the sequencer 46. The sequencer 46 improves the speed of transactions conducted between the host 12 and peripheral device 20 by allowing a series of sequencer commands to be transferred to the USB bridge 16 in a single USB transaction. The set of sequencer commands are then used by the sequencer to perform parallel port operations. The sequencer 46 allows some of the controlling intelligence to be moved from a CPU in host computer 12 to the parallel port side of the USB bridge 16. This reduces the latency previously imposed by having to use one USB transaction for each parallel port operation.

Sequencer 46 executes commands either from the sequencer RAM 40 or from the EEPROM 32. Normally, the commands accessed by sequencer 46 reside in sequencer RAM 40. Sequencer commands in the external device 32 are initiated by including a SUBR command in a sequence of commands in sequencer RAM 40. Each sequence in external device 32 has a RETN command which causes the sequencer 46 to return to the command immediately following the calling SUBR command in the sequencer RAM 40.

The instructions loaded into the external device 32 are either loaded from the host 12 dynamically via USB transactions or preprogrammed during the assembly process of the USB bridge 16. Instructions in sequencer RAM 40 are dynamically loaded from the host 12.

Traditionally, parallel port registers, such as IEEE 1284 registers, were located in close proximity to the host 12. This allowed the host 12 to read and write data without significant latency. With USB, reading or writing the registers requires reestablishing a communication channel with the USB device and sending the appropriate command for every operation on any parallel port register. Repetition of commands causes performance to suffer because of the latency of USB transactions in responding to a request to reestablish a communication channel.

Figure 4:
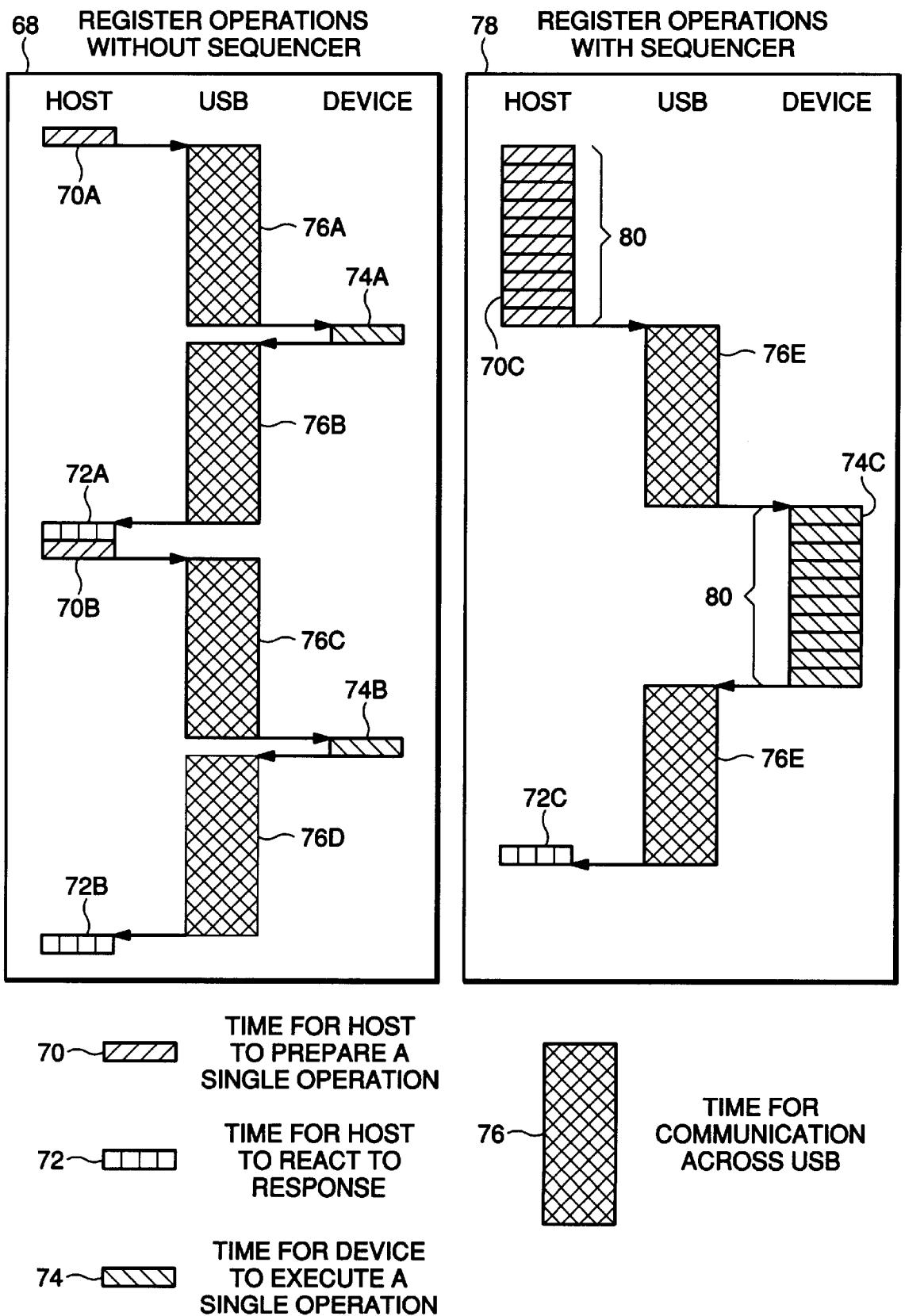
FIG. 4 is a diagram comparing timelines for a USB bridge without a sequencer and a USB bridge utilizing a sequencer according to the invention.

FIG. 4 shows how latency in the USB bridge is reduced with the sequencer 46. Referring to FIGS. 2 and 4, hatched boxes 70 represent the time required for host 12 to prepare a single operation. Dotted boxes 72 represent the time for the host 12 to react to the response of the operation given by device 20. Hatched boxes 74 represent the time for device 20 to execute the single operation sent by host 12. Cross hatched boxes 76 represent an amount of time to communicate the operation or response over the USB.

Diagram 68 shows the total time normally required for two operations to be prepared by the host 12, sent over the USB, executed by the peripheral device 20, sent back over the USB and reacted to by the host 12. The host 12 prepares a first parallel port operation during time 70A. During time 76A, the host 12 conducts a USB transaction that sends the register operation to the peripheral device 20. The peripheral device 20 executes the operation during time 74A. For example, the operation may request the peripheral device 20 to read, write or modify, etc. a peripheral device register. During time 76B, the peripheral device 20 communicates the response from the operation back over the USB to the host 12. The host 12 during time 72A reacts to the response from peripheral device 20.

After the first operation is processed by the host 12, another equally long time period is required to complete a second operation represented by times 70B, 76C, 74B, 76D and 72B. The latency for each operation conducted over the USB is cumulative. This means that each new operation initiated by the host 12 requires the same USB overhead including time period 76A to first send the operation from the host 12 over the USB to the device 20 in addition to time period 76B for sending a response back over the USB to the host 12. This latency increases linearly with the number of operations.

Referring to diagram 78, the sequencer 46 reduces latency caused by USB transaction overhead. Instead of sending one operation at a time, a batch of operations (sequence) 80 is sent during a single USB transaction. The individual times 70C needed to prepare the sequence of operations 80 may be greater than the single time 70A required to prepare a single operation. However, only one USB transaction is used during time 76E to send the entire sequence of operations 80 to the peripheral device 20.

The host 12 typically downloads the sequence of operations to the sequencer RAM 40. The sequencer 46 during time periods 74C steps through the sequence of operations 80 in the sequencer RAM 40. The results/response of the operations 80 are sent back to the host 12 during USB transaction time 76E and the host 12 reacts to the results/response during time 72C. As shown in diagram 78, a large sequence of operations when batched to sequencer 46 over the USB can be completed in less time than required to normally complete two individual operations in diagram 68.

USB bridge protocol flexibility is also increased because the sequences of commands can be programmed by a developer for customized port operations. For example, the instructions loaded into sequencer 46 may add additional functions not normally supported by an IEEE 1284 parallel port 44. The sequencer 46 may also act as a gateway to access protocols other than a parallel bus protocol. For example, the sequencer 46 could be used to connect the USB port to another serial bus protocol.

Figure 5:
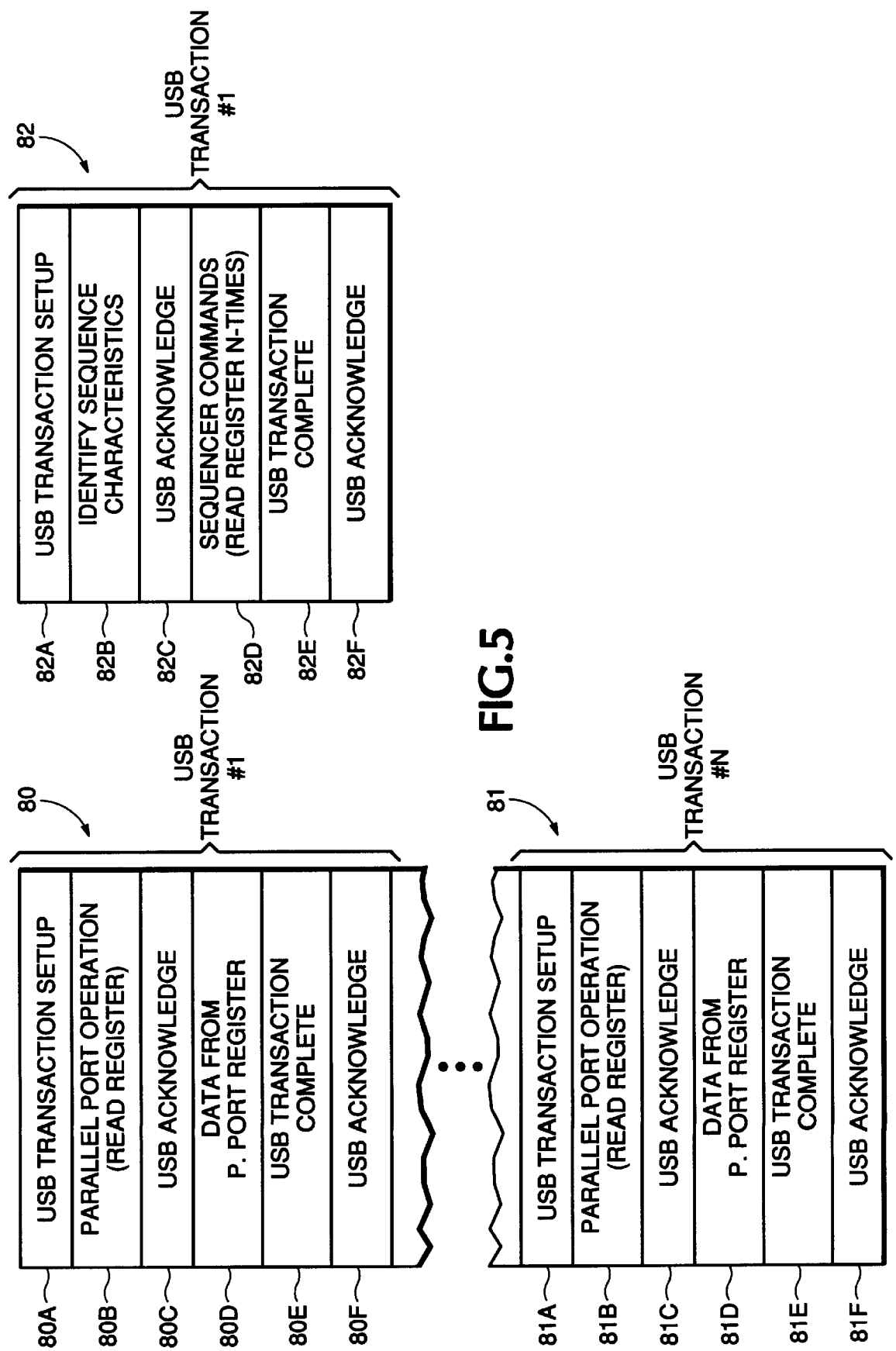
FIG. 5 is a diagram comparing USB transactions for a USB bridge without a sequencer and a USB bridge utilizing the sequencer.

FIG. 5 is a simplified drawing showing in a general manner how batching commands from the host 12 to the sequencer 46 reduce latency. Some of the details of the USB transaction have been left out for clarity. Without the sequencer 46, a series of individual USB transactions 80–81 must be initiated by the host 12 to send a series of operations to the peripheral device 20. For example, a sequence of parallel port operations may comprise reading one of the registers 66 (FIG. 3) in parallel port 44 'N' times.

A first USB transaction 80 initiates a first read of the parallel port register. The protocol for conducting the USB transaction 80 requires the host 12 to first send a setup token 80A to the peripheral device 20. A parallel port operation, such as a "read register" command, is sent in USB data packet 80B. Receipt of the data packet 80B is acknowledged by the peripheral device 20 in USB packet 80C.

Data sent back to the host 12 in response to the "read register" operation is sent back from the bridge 16 to the host 12 in USB data packet 80D. A USB data packet 80E indicates the USB transaction is complete and an acknowledge packet 80F is sent to acknowledge the end of the USB transaction.

The same sequence of USB operations 80A–80F must be performed each time the host 12 reads the parallel port register. The Nth register read is shown in USB transaction 81. The USB operations 81A–81F in USB transaction 81 are essentially the same as the USB operations 80A–80F in the first USB transaction 80. Thus, 'N' register read operations require 'N' USB transactions. A majority of the time required for USB transactions 80–81 is spent on software overhead for the USB transaction setup, USB acknowledges, and USB transaction complete notices.

The sequencer allows the host 12 to use only one USB transaction 82 to carry out the same 'N' parallel port operations initiated by 'N' USB transactions 80–81. The USB setup packet 82A is used to set up the USB transaction 82. The data packet 82B contains configuration information related to the sequence of sequencer commands such as the length of the sequence and how many times to repeat the sequence of sequencer commands. The peripheral device 20 acknowledges receipt of the data packet 82B in 82C.

The host 12 sends the sequence of sequencer commands in data packet 82D. The sequence contained in data packet 82D is loaded into sequencer RAM 40 and instructs the sequencer 46 to perform a series of parallel port operations. For example, the sequence may instruct the sequencer to read a parallel port register 'N' times. The USB transaction is completed by packet 82E and the acknowledge packet 82F.

Because the sequencer 46 allows multiple parallel port operations to be initiated and the results received in a single USB transaction, the host 12 can conduct more parallel port operations in a shorter amount of time.

Figure 6:
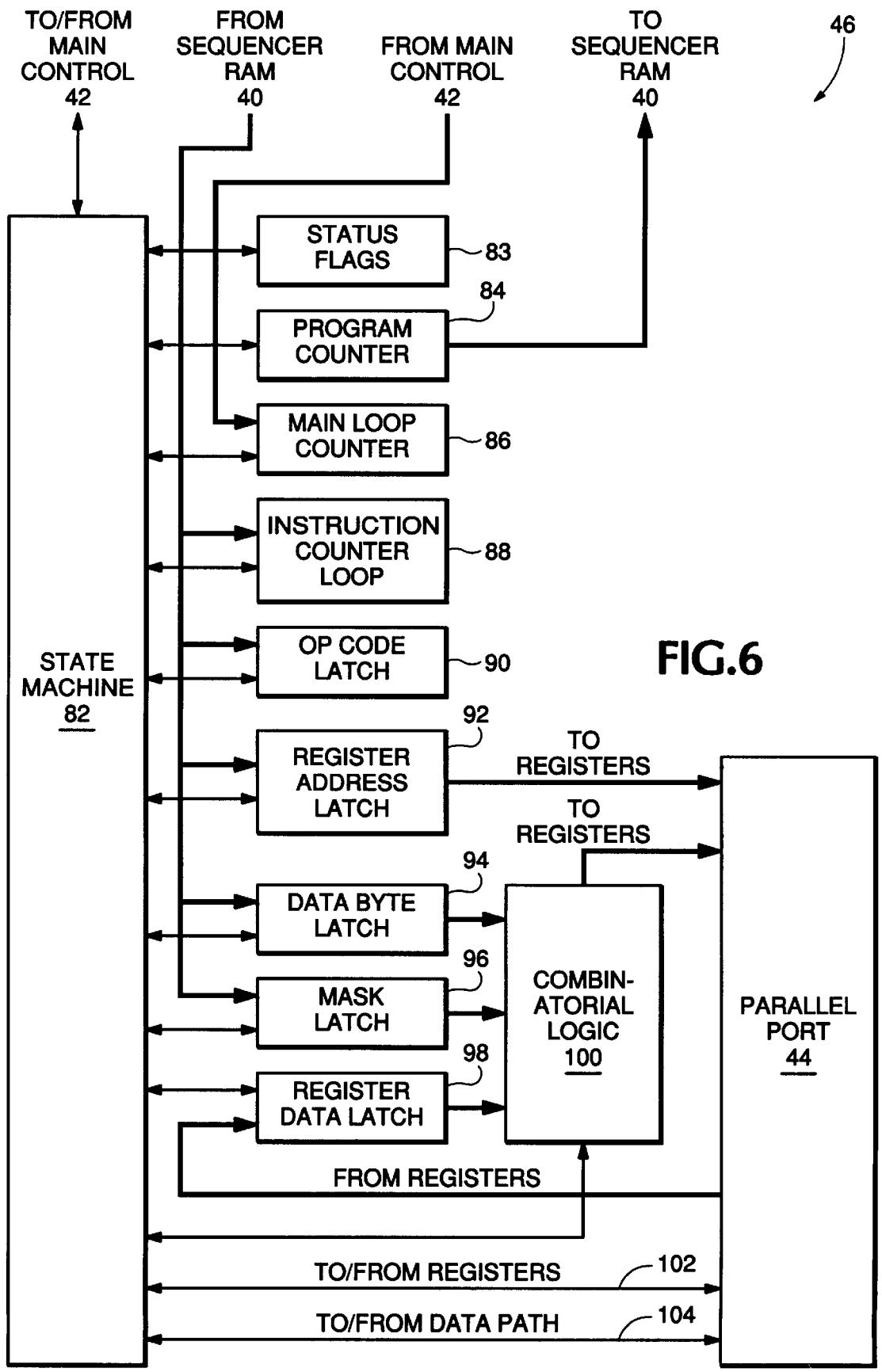
FIG. 6 is a detailed block diagram of the sequencer used in the USB bridge shown in FIG. 2.

FIG. 6 is a detailed diagram of the sequencer 46. A state machine 82 receives signals from the USB interface 42 and controls a group of latches, program counters and status flags. Status flags 83 contain status information about the sequencer operations. A program counter 84 is coupled to the sequencer RAM 40 to sequence through address locations loaded with a sequencer program. A main loop counter 86 receives a value from the USB interface 42 which identifies the number of times the entire sequence is to be performed. An instruction loop counter 88 receives a loop count value from the sequencer RAM 40 that identifies the number of times the current command is to be performed.

An op code latch 90 stores the operational code for the present sequencer command addressed by the program counter 84. A register address latch 94 holds an address value for a register in parallel port 44. A data byte latch 94 holds the value for a data field and a mask latch 96 holds the value of a mask field from sequencer RAM 40 used for performing the presently addressed sequencer command. A register data latch 98 holds a register value associated with the currently addressed sequencer command. Combinational logic 100 performs the logic operations performed in certain sequencer commands.

Control signals 102 are used by the state machine 82 to configure registers in the parallel port 44 for read or write operations. Control signals 104 are used by the state machine 82 to control when and how data is gated between the peripheral device 20 and the bulk_in and bulk_out buffers through the parallel port 44. The sequencer configures the parallel port 44 for these different operations by sending the appropriate signals to the parallel port state machines (FIG. 3).

SEQUENCER INSTRUCTION SET

The sequencer 46 supports a set of instructions that allow sequences of operations to be carried out with the parallel port 44 without intervention from the host 12. These instructions are described below and are also shown in FIGS. 7A–7C.

There are two different types of looping. A first type of looping is performed on an entire instruction sequence. This looping parameter is identified in data packet 82B of the USB transaction (FIG. 5) and specifies the number of times a sequence of sequencer instructions is repeated by the sequencer. The second type of looping is provided by a field in certain sequencer instructions that specifies a number of times the sequencer repeats that particular instruction.

The loop count field in some sequencer operations are used to control an amount of time the sequencer 46 polls for data from the peripheral device 20. In other sequencer operations, the loop count field controls how much data the sequencer reads or writes before moving to a next sequencer command.

RRMW

Register read-modify-write. The addressed register is read and the returned data is modified with the Data and Mask fields and written back. All bits in the original register data for which the corresponding bit Mask byte is set to '1' are replaced with the corresponding bits from the Data byte. Bits in the original register data for which the corresponding Mask byte is '0' will be unchanged after the RRMW instruction.

The RRMW command functionality would look like the following in the C programming language:

"RegisterValue=((RegisterValue & (~MaskField))| (DataField & MaskField))"

RRCM

Register read-compare-until-match. The addressed register is read and resulting data bits for which the corresponding Mask bit is '1' are compared with the corresponding bits in the Data byte. Data bits for which the Mask bit is '0' are not compared. If the bits selected by the Mask byte match, execution passes to the next instruction. If the selected bits don't match, the loop count is decremented and the instruction will execute again after a certain delay. The read/mask/compare process continues until a match is made or the loop count expires, whichever comes first. If the loop count expires, the sequence is aborted.

The RRCM command functionality looks like the following in the C programming language where k is the loop count field value:

"k=LoopCount;
while (((RegisterValue & MaskField)!=(DataField & MaskField)) && (k>0)) k--;
if (k==0) exit(TIME_OUT);"

For example, the following sequencer command
RRCM STAT 256 10111000 11111000
means the sequencer 46 reads the STAT register up to 256 times, going on to the next instruction in the sequence if the upper five bits are ever equal to a data field value '10111', or abort the sequence if the upper five bits never match the data field value. The loop value 256 works as a timer to vary the period of time the sequencer 46 polls the STAT register waiting for data from the peripheral device 20.

RWRI

Register write. A data byte is written to a specified register in the parallel port 44.

RREN

Register read extract nibble. A parallel port status register is read and the bits corresponding to the lines used in an IEEE 1284 Nibble Mode will be extracted and packed into the designated nibble (U='1' for the upper nibble) in the data stream. If U is set to '1', the current nibble and a previously-latched nibble will be concatenated and loaded into the bulk_in buffer 43.

WBIB

Wait for bulk in byte. The sequencer 46 enables the data path and waits until the designated number of bytes has been placed into the bulk_in buffer 43 before continuing. Execution resumes when the designated number of bytes has been made available to the USB host 12. This does not indicate that the host 12 has actually read the data.

WBOB

Wait for bulk_out byte. The sequencer 46 enables the data path and waits until the designated number of bytes has been read from the bulk_out buffer 45 before continuing.

The WBIB and WBOB commands provides more controllability than normally exists when sending commands directly from host 12. If the host 12 wanted to stream data directly from the peripheral device 20, previously the host 12 could only wait for a certain amount of time and then determine what data was actually received. In other words, the host 12 could not specify a particular amount of data be sent by the peripheral device 20 during the operation. This could result in the host 12 receiving too much data or not enough data.

The WBIB and WBOB commands allow a programmer to specify a particular number of bytes (loop field value) that must be read from the bulk_out buffer or written into the bulk_in buffer before the sequencer can move on to the next sequencer command. Thus, the sequencer 46, after completing the WBIB or WBOB instruction, can perform remaining commands in the sequencer program under the assumption that a precise amount of data has been sent or received.

DATI

Push register into bulk_in. This command reads a specified parallel port register 66 and pushes the data into the bulk_in buffer 43. For example, the command: DATI DATA causes the sequencer 46 to read a DATA register in the parallel port registers 66 and pushes the results into the bulk in buffer 43.

DATO

Push bulk_out byte into register. This command reads a byte from the bulk_out buffer 45 and writes the byte into the specified parallel port register 66.

EPPI

Read EPP data register, push byte into bulk_in. This command causes the EPP state machine 62 (FIG. 3) to initiate a read cycle on the parallel port parallel bus that returns data from the peripheral device 20.

NOOP

The sequencer waits for a designated time period before resuming execution.

SUBR

Causes a jump to a subroutine in external memory device 32. The sequencer 46 jumps to the address specified in the external memory device 32 and executes whatever codes that were previously programmed into the external memory device 32. The sequencer 46 continues sequentially executing instructions in the external memory device 32 until coming across a RETN command.

RETN

End of subroutine sequence in external memory device. When the RETN command is encountered in the external memory device 32, the sequencer 46 jumps back to the main sequence in the sequencer RAM 40.

The host 12 can set up sequencer operations in two different ways. In one way, the host 12 loads the sequence onto the USB bridge 16 and then is free to perform or initiate other operations while the sequencer 46 is performing the loaded sequencer commands. Otherwise, the host 12 does not complete the USB request until the sequencer 46 completes execution of the sequencer commands.

Other modifications to the disclosed embodiments will be obvious to those of ordinary skill in the art upon reading this disclosure, and are intended to fall within the scope of the invention as claimed.

What is claimed is:

1. A Universal Serial Bus to parallel bus bridge comprising:

a Universal Serial Bus port receiving a serial bit stream of data and commands in a Universal Serial Bus protocol;

a parallel bus port including parallel port registers for transferring commands and data in a parallel bus protocol;

a controller coupled between the Universal Serial Bus port and the parallel bus port that converts data and commands between the Universal Serial Bus protocol and the parallel bus protocol; and a sequencer coupled between the controller and the parallel bus port autonomously performing a sequence of commands that access the parallel port.

2. A Universal Serial Bus to parallel bus bridge according to claim 1 including a memory storing the sequences of commands performed by the sequencer.

3. A Universal Serial Bus to parallel bus bridge according to claim 1 including a non-volatile memory for preloading sequences of commands performed by the sequencer.

4. A Universal Serial Bus to parallel bus bridge according to claim 1 wherein the parallel bus protocol comprises an IEEE 1284 or ATA protocol.

5. A Universal Serial Bus to parallel bus bridge according to claim 1 wherein the sequencer loops on the whole sequence of commands or loops on one or more of the commands in the sequence.

6. A Universal Serial Bus to parallel bus bridge according to claim 1 wherein one of the sequencer commands comprises a subroutine command that is read by the sequencer from a first memory location and causes the sequencer to jump to a second memory location and begin executing sequential instructions at the second memory location.

7. A Universal Serial Bus to parallel bus bridge according to claim 6 wherein one of the sequencer commands comprises a return command that causes the sequencer to return to sequentially executing commands at a third memory location immediately following the first memory location.

8. A Universal Serial Bus to parallel bus bridge according to claim 7 wherein the first memory location is in a first memory device and the second memory location is in a second memory device.

9. A Universal Serial Bus to parallel bus bridge according to claim 1 wherein at least one of the sequencer commands includes a mask field that determines what bits in parallel port data are analyzed and processed during the command.

10. A Universal Serial Bus to parallel bus bridge according to claim 1 wherein one of the sequencer commands enables the flow of data between the Universal Serial Bus port and the parallel bus port and does not sequence to a next command until a preselected amount of data is transferred.

11. A Universal Serial Bus to parallel bus bridge according to claim 1 wherein one of the sequencer commands comprises repeatedly reading one of the parallel port registers until there is a match with a specified data field or until a specified loop count is reached.

12. A Universal Serial Bus to parallel bus bridge according to claim 1 including a bulk_in buffer coupled between the controller and the parallel port, at least one of the sequencer commands initiating writing of data from the parallel port registers to the bulk_in buffer and another one of the sequencer commands enabling data from a peripheral device to automatically flow through the parallel port into the bulk_in buffer.

13. A Universal Serial Bus to parallel bus bridge according to claim 1 including a bulk_out buffer coupled between the controller and the parallel port registers, at least one of the sequencer commands initiating writing data from the bulk_out buffer into one of the parallel port registers and another one of the commands enabling data from the bulk_out buffer to automatically flow to a peripheral device.

14. A method for transferring information between a first Universal Serial Bus port using a Universal Serial Bus protocol and a second port having a protocol different from the Universal Serial Bus protocol, comprising:

transferring a serial bit stream of data and commands to the Universal Serial Bus port using the Universal Serial Bus protocol;

sending a sequence of commands in the same Universal Serial Bus transaction using the Universal Serial Bus protocol;

storing the sequence of commands; and performing a series of operations in the second port according to the sequence of commands without using additional Universal Serial Bus transactions.

15. A method according to claim 14 including sending the sequence of commands from a Universal Serial Bus host over a Universal Serial Bus cable to a Universal Serial Bus bridge circuit.

16. A method according to claim 15 including preloading other sequences of operations in a memory and sending a command from the Universal Serial Bus host initiating the other sequences of commands.

17. A method according to claim 16 wherein the protocol for the second port comprises an IEEE 1284 or ATA protocol.

18. A method according to claim 14 wherein at least some of the commands include at least one of the following:
- a mask field;
- a data field;
- a loop field; and
- a register address.

19. A Universal Serial Bus bridge for transferring data between a Universal Serial Bus host and an IEEE 1284 device, comprising:
- a Universal Serial Bus core coupled to the Universal Serial Bus host;
- an IEEE 1284 parallel port and IEEE 1284 registers coupled to the IEEE 1284 device;
- a Universal Serial Bus Interface circuit coupled to the Universal Serial Bus core;
- Bulk_in and bulk_out buffers coupled between the Universal Serial Bus interface circuit and the IEEE 1284 port; and
- a sequencer and sequencer memory coupled between the IEEE 1284 port and the USB interface logic.

20. A Universal Serial Bus bridge according to claim 19 including a memory device coupled to the sequencer for storing preloaded sequencer commands.

21. A Universal Serial Bus bridge according to claim 19 wherein the IEEE 1284 parallel port includes an ATA register mode state machine for performing data and register transfers with an ATA device.

* * * * *